(12) United States Patent
Chin

(10) Patent No.: US 6,857,587 B2
(45) Date of Patent: Feb. 22, 2005

(54) WORM SHAFT ATTACHMENT STRUCTURE FOR SPINNING REEL

(75) Inventor: Goh Miang Chin, Singapore (SG)

(73) Assignee: Shimano Inc., Osaka (JP)

( * ) Notice: Subject to any disclaimer, the term of this patent is extended or adjusted under 35 U.S.C. 154(b) by 67 days.

(21) Appl. No.: 10/408,240

(22) Filed: Apr. 8, 2003

(65) Prior Publication Data

US 2003/0197081 A1 Oct. 23, 2003

(30) Foreign Application Priority Data

Apr. 19, 2002 (JP) ..................................... 2002-117516

(51) Int. Cl.[7] .............................................. A01K 89/01
(52) U.S. Cl. ..................................... 242/241; 242/279
(58) Field of Search ................................ 242/241, 242, 242/277, 278, 279

(56) References Cited

U.S. PATENT DOCUMENTS

| | | | | |
|---|---|---|---|---|
| 5,829,699 A | * | 11/1998 | Tsutsumi | 242/241 |
| 5,934,586 A | * | 8/1999 | Kang et al. | 242/241 |
| 6,102,315 A | * | 8/2000 | Sato | 242/249 |
| 6,290,157 B1 | * | 9/2001 | Shibata | 242/241 |
| 6,394,380 B2 | * | 5/2002 | Takikura | 242/279 |
| 6,446,895 B1 | * | 9/2002 | Baenziger et al. | 242/277 |
| 6,460,792 B1 | * | 10/2002 | Morimoto et al. | 242/241 |
| 6,484,956 B2 | * | 11/2002 | Kawabe et al. | 242/278 |

FOREIGN PATENT DOCUMENTS

GB  2261354 A  5/1993

* cited by examiner

Primary Examiner—Emmanuel Marcelo
(74) Attorney, Agent, or Firm—Shinjyu Global IP Counselors, LLP (57) ABSTRACT

A worm shaft attachment structure for a spinning reel includes a mechanism attachment portion having a first attachment portion, and a locking member. The rear end of a worm shaft is attached to the first attachment portion, which includes an aperture portion and a bearing mounting portion that is depressed from the aperture portion in a first direction. The bearing mounting portion can come into contact with an outer circumferential surface of the first bearing, which is mounted to the rear end of the worm shaft. The locking member is mounted detachably to the first attachment portion so as to close the aperture portion, and restricts shifting of the first bearing in the first direction by abutting against the outer circumferential surface of the first bearing. This way, the precision with which a worm shaft is attached is ensured, and the restrictions on the design options are reduced.

17 Claims, 5 Drawing Sheets

Figure 6B

WORM SHAFT ATTACHMENT STRUCTURE FOR SPINNING REEL

BACKGROUND OF THE INVENTION

1. Field of the Invention

This invention generally relates to worm shaft attachment structures. More specifically, the present invention relates to worm shaft attachment structures, in which a worm shaft is attached rotatably to a reel unit via first and second bearings that are disposed at the two ends of the worm shaft, wherein intersecting helical grooves are formed on an outer circumferential surface of the worm shaft, and the worm shaft is for reciprocating a spool back and forth in cooperation with a rotation of a handle, the spool being for winding line on a spinning reel.

2. Background Information

Typical spinning reels include a reel unit, a rotor rotatably supported by the reel unit, and a spool around which fishing line can be wound. The rotor has a pair of arm portions. Between the two arm portions, a bail is provided that can be switched between a line-winding posture and a line-releasing posture. Furthermore, a line roller for guiding fishing line to the spool when winding up line is provided at the front end of one of the arm portions.

Such spinning reels are provided with an oscillation mechanism for winding fishing line that is guided by the bail and the line roller, uniformly in horizontal direction relative to the spool. This oscillation mechanism is disposed inside the reel unit, and includes a worm shaft that is arranged parallel to the spool shaft on which the spool is mounted, a transmission mechanism that lets the worm shaft rotate in cooperation with the rotor, and a slider engaging the worm shaft.

Intersecting helical grooves are formed on the outer periphery of the worm shaft, and the worm shaft is supported rotatably by the reel unit via two bearings mounted to both ends. An intermediate gear for transmitting rotation from a pinion gear to the worm shaft is mounted non-rotatably to the front of the worm shaft.

Conventionally, the rear end of the worm shaft is supported via a bearing by a rear wall portion formed at the rear of the reel unit. A through hole through which the worm shaft can pass is formed in the rear wall portion, and the front end of the worm shaft is supported by the reel unit via a bearing mounted to that through hole. Furthermore, the front end of the worm shaft is supported via a bearing by a concave hole formed in the front of the reel unit. When attaching such a worm shaft to a reel unit, the front end of the worm shaft is inserted from behind the reel unit through the through hole on the rear end side, while the bearing is mounted to the concave hole on the front side, and after the intermediate gear is mounted at the front, the front end of the worm shaft is mounted to the bearing mounted in the concave hole. Then, a bearing is fitted in the through hole on the rear end side, and a locking plate preventing the bearing from falling off is mounted to the rear face of the rear wall portion, thereby finalizing the operation of attaching the worm shaft.

With this oscillation mechanism, the slider is shifted back and forth along the worm shaft while engaging helical grooves in the worm shaft, which rotates in cooperation with a rotation of the handle. By shifting the slider back and forth along the worm shaft, the spool shaft and the spool can also be shifted back and forth. Thus, fishing line can be wound uniformly around the spool by shifting the spool back and forth in cooperation with the rotation of the handle and in synchronization with the rotor.

With the worm shaft attachment structure of the conventional configuration as described above, the through hole formed in the rear wall of the reel unit and the concave hole formed in front are formed individually in the back and the front. For this reason, if the reel unit is retrieved from the die in lateral direction when forming the reel unit by die forming using a fixed die, such as die casting or injection molding, then the through hole and the concave hole have to be formed with special sliding dies that slide back and forth and are provided separately from the fixed die. If the through hole and the concave hole are formed using such special sliding dies, then the sliding dies may be shifted out of position during the molding even if they are arranged concentrically with high precision. For this reason, it is difficult to form the concave hole and the through hole concentrically with high precision, and it is hard to maintain the attachment precision of the worm shaft. In particular in the case of large spinning reels, the length of the worm shaft becomes long, so that it becomes difficult to ensure the precision.

Furthermore, since the worm shaft is mounted from the rear, if a separate outer peripheral portion of the reel unit is formed behind the rear wall portion, then it is necessary to provide the outer peripheral portion with a through hole for passing through the worm shaft. And forming such a through hole may restrict the design options for that portion.

In view of the above, there exists a need for a worm shaft attachment structure for a spinning reel, which overcomes the above mentioned problems in the prior art. This invention addresses this need in the prior art as well as other needs, which will become apparent to those skilled in the art from this disclosure.

SUMMARY OF THE INVENTION

It is thus a purpose of the present invention to provide a worm shaft attachment structure for a spinning reel, in which the attachment precision of the worm shaft can be ensured easily, and restrictions on the design options are reduced.

A worm shaft attachment structure for a spinning reel according to a first aspect of the present invention is a structure in which a worm shaft is attached rotatably to a reel unit via a first and a second bearing that are disposed at two ends of the worm shaft. Intersecting helical grooves are formed on an outer circumferential surface of the worm shaft. The worm shaft is for reciprocating a spool, in cooperation with a rotation of a handle, back and forth for winding line on a spinning reel. The worm shaft attachment structure includes a mechanism attachment portion and a locking member. The mechanism attachment portion is formed unitarily with the reel unit. The rear end of the worm shaft is mountable to the first attachment portion, which includes an aperture portion and a bearing mounting portion. The bearing mounting portion is depressed from the aperture portion in a first direction, which is a direction intersecting with a rotation axis direction of the worm shaft. The bearing mounting portion can come into contact with an outer circumferential surface of the first bearing, to which the rear end of the worm shaft is attachable. The locking member is mounted detachably to the first attachment portion so as to close the aperture portion, and restricts shifting of the first bearing in the first direction by abutting against the outer circumferential surface of the first bearing.

With this worm shaft attachment structure, when the rear end of the worm shaft is attached to the first attachment portion, the first bearing is mounted to the rear end of the worm shaft. In this state, the worm shaft is mounted to the bearing mounting portion while shifting the first bearing from the aperture portion in the first direction. Then, the locking member is mounted, thereby restricting movement of the first bearing in the first direction. Here, the first attachment portion is provided not with a through hole but with a bearing mounting portion that is open in the first direction. The rear end of the worm shaft to which the first bearing is attached is mounted to the bearing mounting portion by moving the worm shaft in the first direction. Therefore, it is possible to form the first attachment portion with high precision by die forming with a fixed die, without having to use a sliding die, which shifts in the axial direction. Consequently, even when the front end of the worm shaft is attached to another attachment portion, which is formed with a sliding die, then the two attachment portions can be arranged concentrically with high precision, and the precision with which the worm shaft is attached can be easily ensured as long as the precision of the sliding die for the second attachment portion is ensured. Moreover, there is no need to mount the worm shaft from the rear, so that even when the reel unit is provided with an outer peripheral portion behind the first attachment portion, there is no need to provide a through hole for passing the worm shaft through the outer peripheral portion. Therefore, there are fewer restrictions on the design options.

In accordance with a worm shaft attachment structure for a spinning reel according to a second aspect of the present invention, in the structure according to the first aspect, the first direction is substantially parallel to a direction of the rotation axis of the handle. With this configuration, the rotation axis of the handle usually coincides with the lateral direction, that is, the direction of retrieval from the die. Therefore, the first attachment portion can be formed with even higher precision with a fixed die.

In accordance with a worm shaft attachment structure for a spinning reel according to a third aspect of the present invention, in the structure according to the first or second aspect, the locking member is a plate-shaped member that is bent over so as to restrict the shifting of the first bearing in the rotation axis direction by closing the aperture portion, while also abutting against a rear end surface of the first bearing. With this configuration, shifting of the first bearing in the first direction and shifting of the first bearing in the rotation axis direction that intersects with the first direction can be restricted with a simple bent structure.

In accordance with a worm shaft attachment structure for a spinning reel according to a fourth aspect of the present invention, the structure according to any of the first to third aspects further comprises a second attachment portion to which a front end of the worm shaft is attached, wherein the second attachment portion is formed unitarily with the reel unit, and wherein the second bearing, which is disposed at the front end of the worm shaft, is mounted to the second attachment portion. With this configuration, after attaching the rear end of the worm shaft to the first attachment portion from the first direction, the front end of the worm shaft is attached to the second attachment portion via the second bearing, thereby facilitating the attaching of the worm shaft. Moreover, even if the second attachment portion is formed by a sliding die, the precision with which the worm shaft is attached can be easily ensured if only the precision of the formation with the sliding die is ensured.

In accordance with a worm shaft attachment structure for a spinning reel according to a fifth aspect of the present invention, in the structure according to the fourth aspect, the second attachment portion includes a through hole portion through which the worm shaft can be passed, and the second bearing is mounted in that through hole portion. With this configuration, the worm shaft is passed through the through hole portion, so that it can be mounted from the front of the reel unit. Since the front of the reel unit is usually covered by the rotor, the through hole portion is not exposed to the outside.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
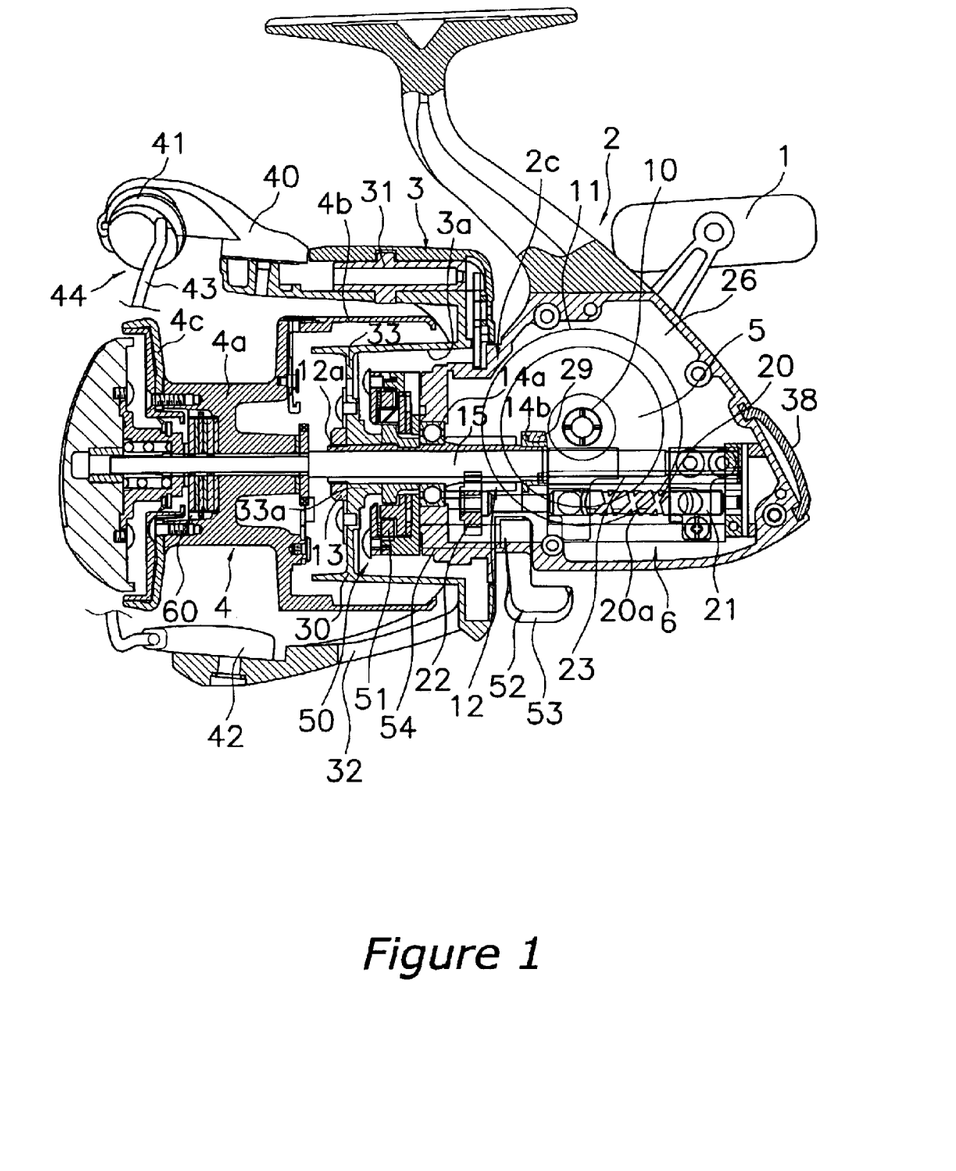
FIG. 1 is a left side cross-sectional view of a spinning reel according to one embodiment of the present invention.

Referring initially to FIG. 1, a spinning reel is illustrated in accordance with a first embodiment of the present invention.

As shown in FIG. 1, a spinning reel in accordance with an embodiment of the present invention is a large spinning reel, which is provided primarily with a reel unit 2 that rotatably supports a handle 1 and is to be mounted to a fishing rod, a rotor 3, a spool 4, a rotor driving mechanism 5 and an oscillation mechanism 6. The rotor 3 is for winding fishing line on the spool 4 and is supported rotatably at the front of the reel unit 2. The spool 4 is for winding fishing line around its outer circumferential surface, and is arranged at the front of the rotor 3 such that it can be shifted back and forth. It should be noted that the handle 1 can be mounted to either the left or the right side of the reel unit 2. The rotor driving mechanism 5 rotates the rotor 3 in cooperation with the rotation of the handle 1. The oscillation mechanism 6 reciprocates the spool 4 back and forth in cooperation with the rotation of the handle 1.

Figure 2:
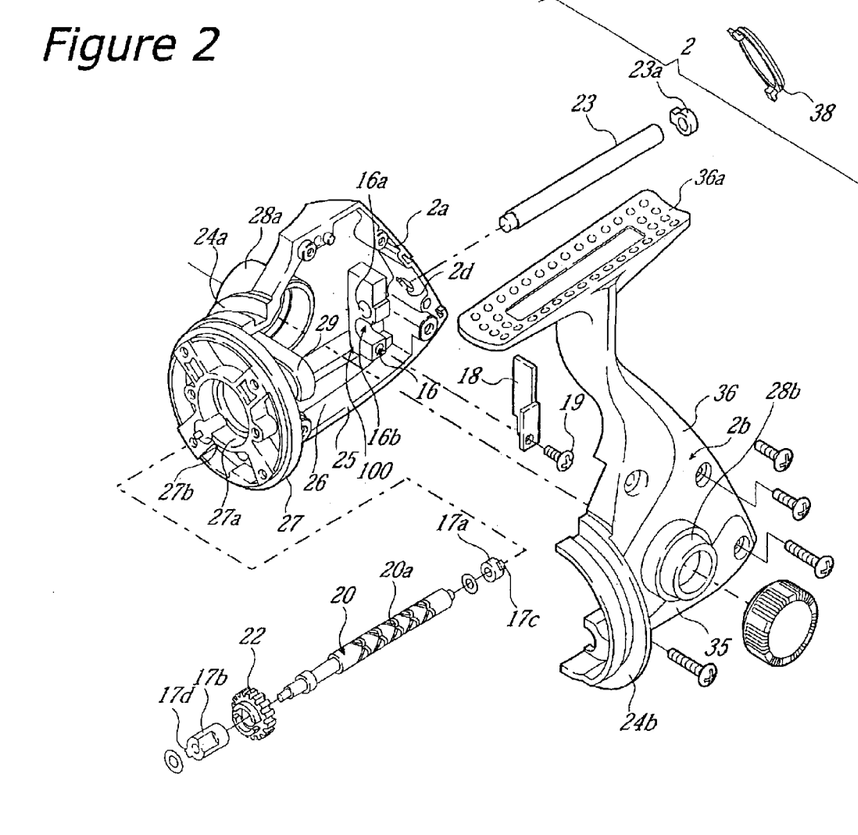
FIG. 2 is an exploded perspective view of the reel unit according to the embodiment of the present invention.
Figures 3, 4:
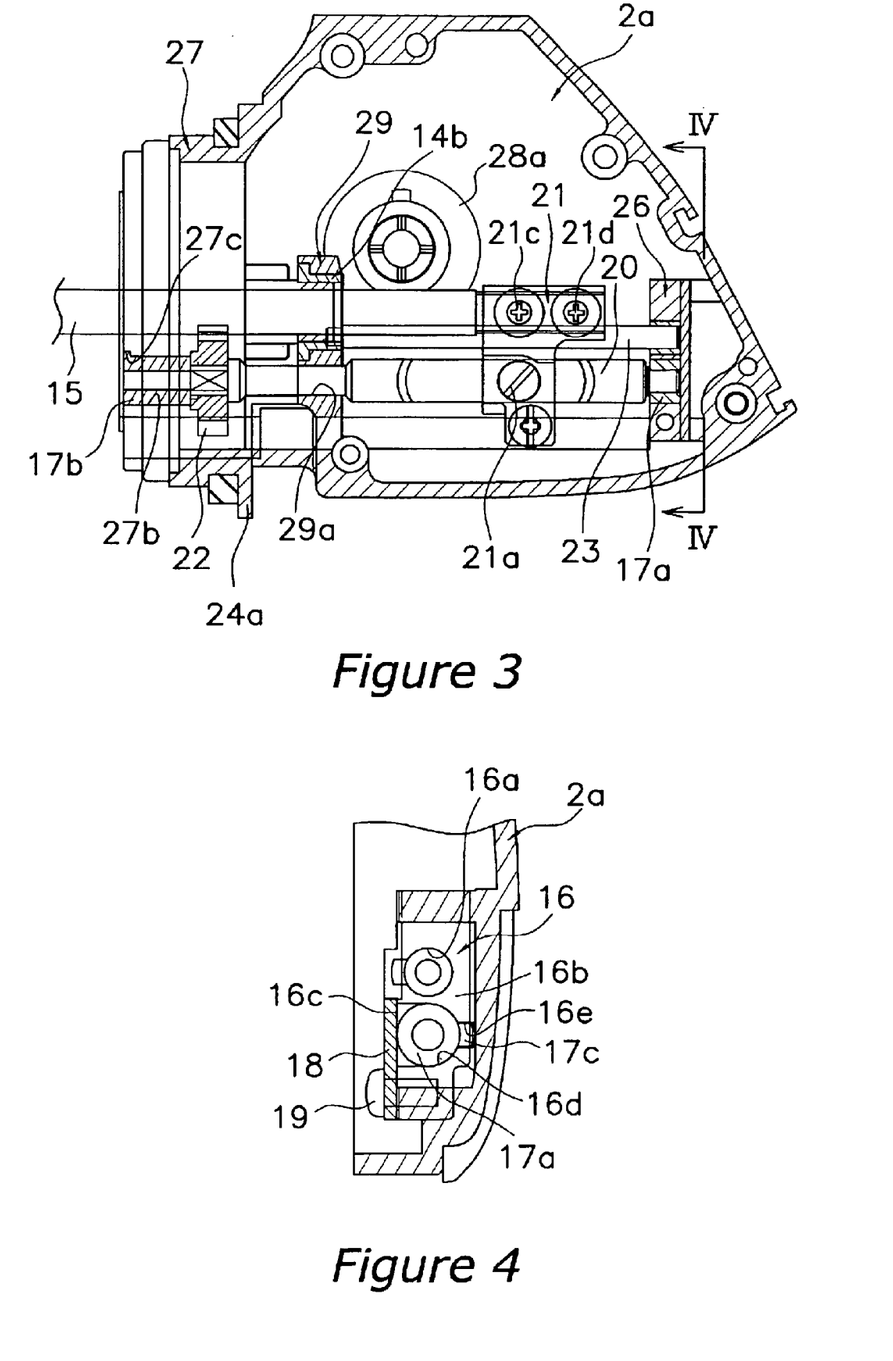
FIG. 3 is a cross-sectional enlarged view of the casing according to the embodiment of the present invention.
FIG. 4 is a cross-sectional view of the casing according to the embodiment of the present invention taken along IV—IV in FIG. 3.

As shown in FIGS. 2 to 4, the reel unit 2 principally includes a casing 2a supporting the rotor 3 and the spool 4, a lid portion 2b detachably screwed to the casing 2a, and a circular flange portion 2c having first and second flange portions 24a and 24b respectively formed unitarily with the casing 2a and the lid portion 2b.

The casing 2a is, for example, made of a polyamide-based synthetic resin reinforced by glass fibers, and is produced by injection molding. The casing 2a has an opening 25 formed at its side, a mechanism accommodating space 26 formed inside, a rotation support portion 27 and a first handle support portion 28a. The rotation support portion 27 is arranged inside the circular hollow 3a formed at the reel unit 2 side of the rotor 3, and is for rotatably supporting the rotation shaft (the pinion gear 12 described later) of the rotor 3. The first handle support portion 28a is made of a boss portion for supporting one end of the handle shaft 10, which is the rotation shaft of the handle 1. The casing 2a has about half the thickness of the reel unit 2.

The opening 25 is provided in three portions with the exception of the front portion, that is, the upper, the lower, and the rear portions, to mount various mechanisms in the mechanism accommodating space 26. As shown in FIG. 1, the mechanism accommodating space 26 accommodates a rotor driving mechanism 5 and an oscillation mechanism 6. The rotation support portion 27 is of substantially columnar shape and is formed unitarily with the first semi-circular flange portion 24a, which is also formed unitarily with the front of the mechanism accommodating space 26. The rotation support portion 27 has a through hole 27a (FIG. 2) through the center of which the pinion gear 12 passes. A one-way clutch 51 of the later-described reverse rotation prevention mechanism 50 is screwed fast on the front face of the rotation support portion 27.

Furthermore, as shown in FIG. 2 and FIG. 5, the rotation support portion 27 is provided with a second attachment portion 27b for attaching a front end of the worm shaft 20 of the oscillation mechanism 6 together with a second bearing 17b. The second attachment portion 27b is formed passing through the rotation support portion 27 in a shape that overlaps partly with the outer peripheral portion of the through hole 27a.

A gear support portion 29 for supporting the rear end of the pinion gear (to be explained later) 12 is formed at an intermediate portion of the casing 2a. The gear support portion 29 is a thick-walled rib that is formed protruding towards the lid portion 2b. A bushing 14b (see FIG. 1) for rotatably supporting the rear of the pinion gear 12 is mounted to it. The gear support portion 29 is provided with a through hole 29a through which the later-described worm shaft 20 can be passed.

At the rear of the casing 2a, a worm shaft attachment structure 100 for attaching the rear end of the oscillation mechanism 6 is provided. The worm shaft attachment structure 100 includes a mechanism attachment portion 16 and a locking member 18. The mechanism attachment portion 16 is a thick-walled rib that is formed at the rear end and protrudes towards the lid portion 2b. As shown in the drawings, a guide support portion 16a pierced by a guide shaft (to be explained later) 23 of the oscillation mechanism 6 is formed in an upper portion of the mechanism attachment portion 16.

The mechanism attachment portion 16 includes a first attachment portion 16b, at which the rear portion of the worm shaft (to be explained later) 20 of the oscillation mechanism 6 is attached, in a central portion of the mechanism attachment portion 16. The first attachment portion 16b includes an aperture portion 16c, a bearing mounting portion 16d, and a depression 16e. The bearing mounting portion 16d can come into contact with the outer circumferential surface of a first bearing 17a, which is mounted to the rear end of the worm shaft 20. The bearing mounting portion 16d is depressed in a U-shape from the aperture portion 16c in a first direction, which is substantially parallel (that is, intersecting with the rotation axis of the worm shaft 20) to the handle shaft 10, which is a rotation shaft of the handle 1. The aperture portion 16c is closed by the locking member 18. The locking member 18 is mounted detachably with a screw 19 to the first attachment portion 16b, such that the aperture portion 16c is closed.

The locking member 18 is a plate-shaped member made of metal that is bent over so as to curb the shifting of the first bearing 17a in both directions. The locking member 18 is in contact with the outer circumferential surface and the rear surface of the first bearing 17a, so that it curbs the shifting of the first bearing 17a in the first direction as well as in a second direction, which is perpendicular to the first direction.

The lid portion 2b is made of, for example, a polyamide-based synthetic resin reinforced by glass fibers, and is manufactured by injection molding. As shown in FIG. 2, the lid portion 2b has a thin-walled cover portion 35 and a mounting leg portion 36 for attachment to the fishing rod. The cover portion 35 is formed unitarily with the second flange portion 24b serving as a wall portion at the side to which the rotor 3 is mounted, so that the cover portion 35 covers the opening 25 of the casing 2a, and a space is formed in the interior thereof. The mounting leg portion 36 extends upward from the cover portion 35. The cover portion 35 is formed with substantially half the thickness of the reel unit 2. In the upper portion and the rear portion of the cover portion 35 except the front portion, a trimmed portion is formed opposing the opening 25. At the front of the cover portion 35, the substantially semi-circular second flange portion 24b is formed. An inner side portion of the second flange portion 24b that protrudes inwardly has the function to serve as a wall portion for reinforcing the cover portion 35. On one side of the cover portion 35, a second handle support portion 28b having a boss portion for supporting the other end of the handle shaft 10 is formed.

The mounting leg portion 36 is a solid, thick-walled member, one end of which extends both forward and backward, forming a fishing rod-mounting portion 36a. The boundary portion between the cover portion 35 and the mounting leg portion 36 is cut out at approximately half the thickness, and the upper portion of the casing 2a is inserted into the cut-out portion so that the outer side faces are smoothly connected. The first and second handle support portions 28a and 28b are tubular members that are provided in the casing 2a and the lid portion 2b, and bearings (not shown in the drawings) are mounted inside them.

On the lower rear surface of the reel unit 2, a name plate 38 is fixed. With this name plate 38, the mounting hole 2d (see FIG. 2) for mounting the guide shaft 23 of the oscillation mechanism 6 can be hidden.

As shown in FIG. 2, the rotor driving mechanism 5 includes a handle shaft 10, a master gear 11, which is a face gear, and a pinion gear 12. The master gear 11 rotates together with the handle shaft 10, to which the handle 1 is fixed. The pinion gear 12 meshes with the master gear 11. The pinion gear 12, which serves as the rotation shaft of the rotor 3, is tubular. Its front portion 12a penetrates the center of the rotor 3, and is fixed with a nut 13 to the rotor 3. The middle and the rear end (with respect to the axial direction)

of the pinion gear 12 are rotatably supported by the reel unit 2 via a bearing 14a mounted to the rotation support portion 27 and a bushing 14b mounted to the gear support portion 29.

The oscillation mechanism 6 shifts back and forth the spool shaft 15, which is linked to the middle portion of the spool 4 via a drag mechanism 60, thereby shifting the spool 4 also back and forth. As shown in FIGS. 1 to 3, the oscillation mechanism 6 includes a worm shaft 20, a slider 21, an intermediate gear 22, and the guide shaft 23. The worm shaft 20 is arranged below the spool shaft 15 in parallel thereto. The slider 21 moves back and forth along the worm shaft 20, to the front end of which the intermediate gear 22 is fixedly coupled.

Intersecting helical grooves 20a are formed on an outer circumferential surface of the worm shaft 20. The first bearing 17a attached to the first attachment portion 16b is mounted at the rear end of the worm shaft 20, and the second bearing 17b attached to the second attachment portion 27b is mounted to the front end of the worm shaft 20. The first bearing 17a can be attached from the aperture portion 16c of the first attachment portion 16b. The second bearing 17b can be attached to the second attachment portion 27b from the front. The two bearings 17a and 17b for rotational support are, for example, bushings made of a synthetic resin such as polyacetal. As shown in FIG. 2, the two bearings 17a and 17b have protrusions 17c and 17d for stopping rotation and positioning in the axial direction. These protrusions 17c and 17d interlock with depressions 16e and 27c formed in the first and second attachment portions 16b and 27b.

The rear end of the spool shaft 15 is non-rotatably fixed to the slider 21 by two screws 21c and 21d. Inside the slider 21, an engagement member 21a engaging the helical grooves 20a is mounted such that it can rotate around an axis perpendicular to the worm shaft 20. This engaging member 21a engages the helical grooves 20, thereby converting the rotation of the worm shaft 20 into a reciprocating motion of the slider 21.

The intermediate gear 22 meshes with the pinion gear 12. The slider 21 is pierced by the worm shaft 20 and the guide shaft 23, which is arranged above the worm shaft 20 in parallel thereto. The worm shaft 20 and the guide shaft 23 guide the slider 21 back and forth with respect to the reel unit 2.

As shown in FIG. 1, the rotor 3 includes a cylindrical portion 30, and a first rotor arm 31 and a second rotor arm 32 provided in opposition on the sides of the cylindrical portion 30. The cylindrical portion 30 and the two rotor arms 31 and 32 are formed as a one-piece unitary unit.

A front wall 33 is formed at the front of the cylindrical portion 30, and a boss portion 33a is formed in the center of this front wall 33. The front end 12a of the pinion gear 12 and the spool shaft 15 are passed through the through hole in the boss portion 33a. The nut 13 is arranged at the front of the front wall 33, and the nut 13 is screwed into a threaded portion at the front end of the pinion gear 12. In the cylindrical portion 30, the portion rearward from the front wall 33 is a hollow 3a, and the flange portion 2c is formed unitarily with the casing 2a and the lid portion 2b, flush with the rear end face of the hollow 3a.

A first bail-support member 40 is fitted pivotably onto the outer peripheral side of the front end of the first rotor arm 31. A line roller 41 for guiding fishing line onto the spool 4 is mounted to the front end of the first bail-support member 40. A second bail-support member 42 is fitted pivotally onto the outer peripheral side of the front end of the second rotor arm 32. A bail 43 is provided between the line roller 41 at the front end of the first bail-support member 40 and the second bail-support member 42. These first and second bail-support members 40 and 42, the line roller 41, and the bail 43 together form a bail arm 44.

A reverse rotation prevention mechanism 50 for prohibiting/releasing reversal of the rotor 3 is disposed within the cylindrical portion 30 of the rotor 3. The reverse rotation prevention mechanism 50 has a roller-type one-way clutch 51, and an operation mechanism 52 for switching the one-way clutch 51 between an operational state and a non-operational state. The outer race of the one-way clutch 51 is fixed to the rotation support portion 27, and the inner race thereof is non-rotatably interlocked with the pinion gear 12. The operation mechanism 52 has an operation lever 53 disposed between the casing 2a and the lid portion 2b, and an operation shaft 54 provided with the operation lever 53 at its rear end and mounted pivotably to the casing 2a. The operation mechanism 52 can switch the one-way clutch 51 between an operational state and a non-operational state by pivoting the operation lever 53 and thereby pivoting a cam protrusion (not shown in the figures) at the front end of the operation shaft 54. When the one-way clutch 51 is in the operational state, reverse rotation of the rotor 3 is impossible, whereas when the one-way clutch 51 is in the non-operational state, reverse rotation of the rotor 3 is possible.

The spool 4 is arranged between the first rotor arm 31 and the second rotor arm 32 of the rotor 3, and is mounted to the front end of the spool shaft 15 with the drag mechanism 60 interposed between the spool shaft 15 and the spool 4. The spool 4 has a bobbin trunk portion 4a onto which fishing line is wound, a skirt portion 4b that is formed unitarily with the rear of the bobbin trunk portion 4a, and a front flange portion 4c fixed to the front end of the bobbin trunk portion 4a.

A procedure for assembling the oscillation mechanism 6 in a spinning reel with the above configuration is explained with reference to FIG. 4 and FIG. 5.

Figure 5A:
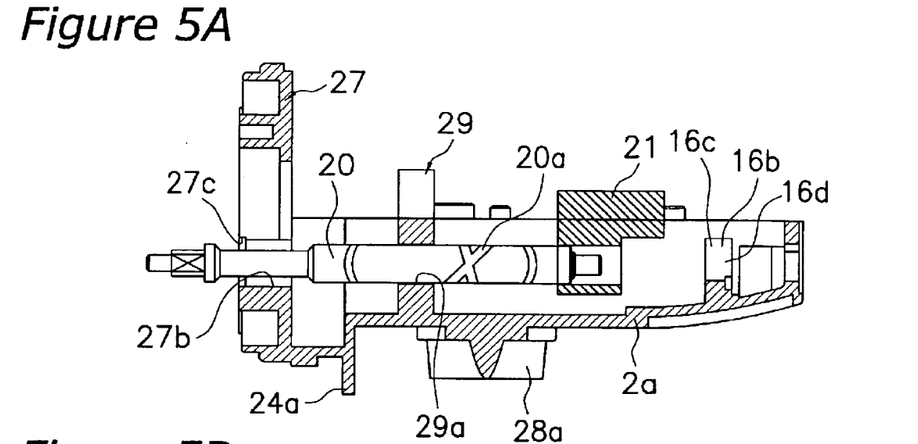
FIG. 5 are left side cross-sectional views of the casing according to the embodiment of the present invention, illustrating the procedure for assembling the oscillation mechanism.
Figure 5B:
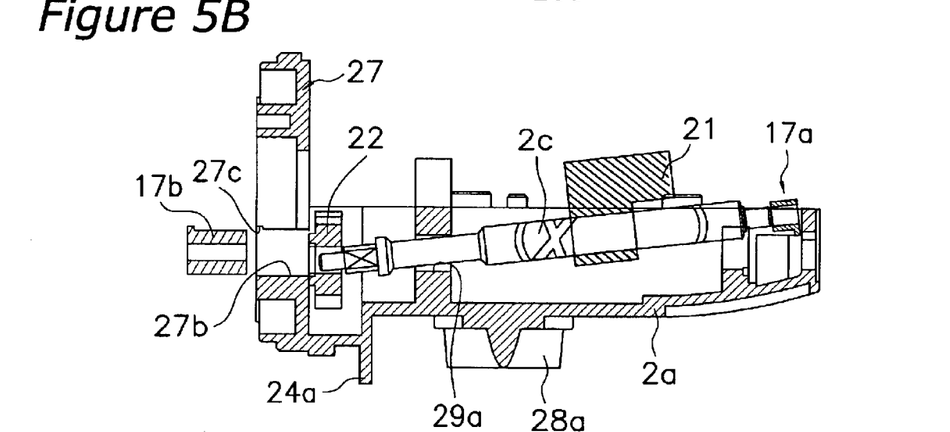
Figure 5C:
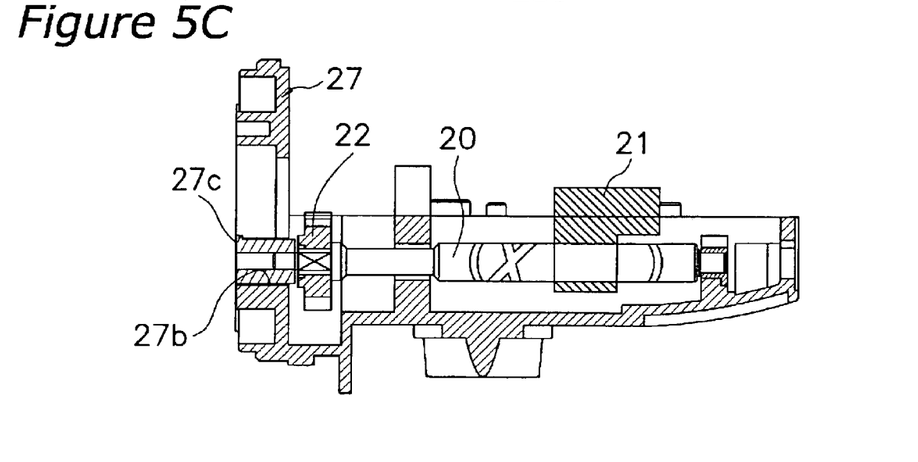

When assembling the oscillation mechanism 6, first, the worm shaft 20 is attached to the casing 2a. As shown in FIG. 5(A), to attach the worm shaft 20, the worm shaft 20 is passed through the through hole 29a and the slider 21 from the front of the second attachment portion 27b, thus inserting it into the casing 2a, while the slider 21 is arranged at a predetermined position. Then, as shown in FIG. 5(B), the rear end of the worm shaft 20 is lifted upward in radial direction towards the lid portion 2b and slightly tilted, opening a gap at the front end, where the intermediate gear 22 is placed. Moreover, the first bearing 17a is mounted to the rear end of the worm shaft 20, and the second bearing 17b is mounted to the second attachment portion 27b, fitting the protrusion 17d into the depression 27c. This second bearing 17b is locked by the one-way clutch 51 mounted to the rotation support portion 27. In this situation, the worm shaft 20 is passed through the intermediate gear 22, and its tip is inserted into the second bearing 17b, while the first bearing 17a at the rear end is fitted into the bearing mounting portion 16d from the aperture portion 16c of the first attachment portion 16b of the mechanism attachment portion 16. In this situation, the protrusion 17c is engaged with the depression 16e. Thus, the two ends of the worm shaft 20 are supported by the first and the second bearing 17a and 17b, as shown in FIG. 5(C).

Figure 6A:
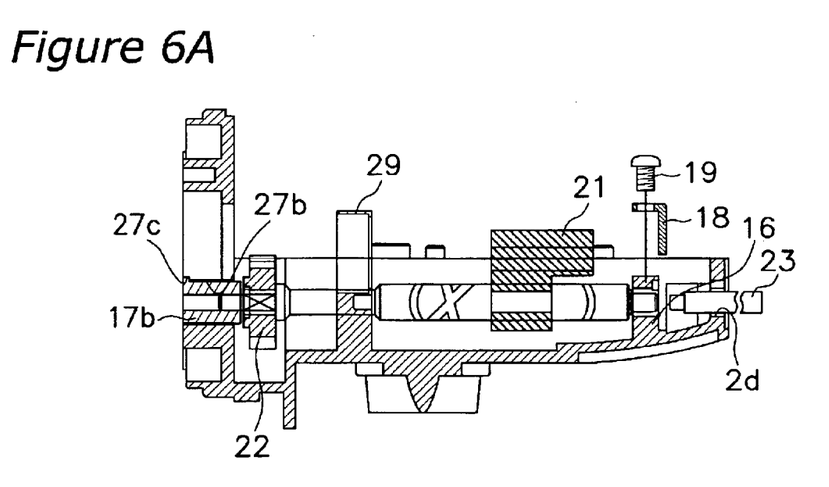
FIG. 6 are cross-sectional views of the casing from below according to the embodiment of the present invention illustrating the procedure for assembling the oscillation mechanism.
Figure 6B:
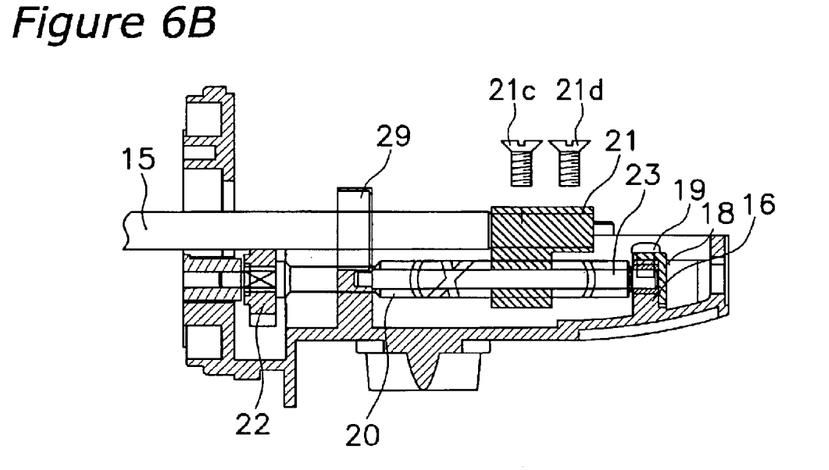

Next, the guide shaft 23 is mounted. The guide shaft 23 is mounted from the rear of the casing 2a, as shown in FIG. 6. First, the guide shaft 23 is passed from the rear of the casing 2a through the mounting hole 2d, then further passed through the slider 21, and its front end is interlocked with the gear support portion 29. Then, the guide shaft 23 is attached to the guide support portion 16a of the mechanism attachment portion 16 via the bearing 23a. Then, the locking member 18 is fixed to the first attachment portion 16b with a screw 19, and the first bearing 17a and the bearing 23a are locked and positioned with respect to the axial direction and the radial direction. This state is shown in FIG. 6(B). Then, the rear end of the spool shaft 15 is fixed to the slider 21 with two screws 21c and 21d, thus finishing the assembly of the oscillation mechanism 6.

In this assembly, the first attachment portion 16b is provided not with a through hole but with a bearing mounting portion 16d that is open to the first direction. The rear end of the worm shaft 20 to which the first bearing 17a has been mounted is attached to it by shifting it in the radial direction. Therefore, it is possible to form the first attachment portion 16b with high precision by die forming with a fixed die, without using a sliding die that is shifted in the axial direction. Consequently, even when the front end of the worm shaft 20 is attached to the second attachment portion 27b, which is formed with a sliding die, then the two attachment portions 16b and 27b can be arranged concentrically with high precision and the precision with which the worm shaft 20 is attached can be easily ensured as long as the precision of the sliding die for the second attachment portion 27b is ensured. Moreover, there is no need to mount the worm shaft 20 from the rear, so that even when the reel unit 2 is provided with an outer peripheral portion behind the first attachment portion 16b, there is no need to provide a through hole for passing the worm shaft 20 through the outer peripheral portion. Therefore, there are fewer restrictions on the design options of the outer peripheral portion of the reel unit 2.

Other Embodiments (a) The spinning reel to which the present invention is applied is not limited to the foregoing embodiment; the present invention may also be applied to spinning reels having a rear drag mechanism, or to spinning reels on which a rotor braking mechanism having a braking lever is mounted.

(b) The shape of the locking member is not limited to the one described in the present embodiment, and it may also be molded out of resin.

Effect of the Invention

With the present invention, the first attachment portion is provided not with a through hole but with a bearing mounting portion that is open to a first direction, and the rear end of the worm shaft to which the first bearing has been mounted is attached to it by shifting it in a first axial direction. Therefore, it is possible to form the first attachment portion with high precision by die forming with a fixed die, without using a sliding die that is shifted in the axial direction. Consequently, even when the front end of the worm shaft is attached to another attachment portion, which is formed with a sliding die, then the two attachment portions can be arranged concentrically with high precision and the precision with which the worm shaft is attached can be easily ensured if only the precision of the sliding die for the second attachment portion is ensured. Moreover, there is no need to mount the worm shaft from the rear. Therefore, even when the reel unit is provided with an outer peripheral portion behind the first attachment portion, there is no need to provide a through hole for passing the worm shaft through the outer peripheral portion. Therefore, there are fewer restrictions on the design options.

As used herein, the following directional terms "forward," "rearward," "above," "downward," "vertical," "horizontal," "below" and "transverse" as well as any other similar directional terms refer to those directions of a device equipped with the present invention. Accordingly, these terms, as utilized to describe the present invention should be interpreted relative to a device equipped with the present invention.

The terms of degree such as "substantially," "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2002-117516. The entire disclosure of Japanese Patent Application No. 2002-117516 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A worm shaft attachment structure for a spinning reel having a reel unit, a handle, a rotor, and a spool for winding line back and forth in cooperation with a rotation of the handle and the rotor, a worm shaft being rotatably attached to the reel unit via first and second bearings that are disposed at two ends of the worm shaft, the worm shaft having intersecting helical grooves formed on an outer circumferential surface thereof, the worm shaft being for reciprocating the spool, said worm shaft attachment structure comprising:

a mechanism attachment portion formed unitarily with the reel unit, said mechanism attachment portion having formed thereon a first attachment portion, to which a rear end of the worm shaft being mountable, said first attachment portion having an aperture portion and a bearing mounting portion that is depressed from said aperture portion in a first direction, which intersects with a rotation axis direction of the worm shaft, said bearing mounting portion being able to come into contact with an outer circumferential surface of the first bearing, to which the rear end of the worm shaft is attachable; and a locking member that is mounted detachably to said first attachment portion so as to close said aperture portion and to restrict shifting of the first bearing in the first direction by abutting against the outer circumferential surface of the first bearing.

2. The worm shaft attachment structure for a spinning reel according to claim 1, wherein
the first direction is substantially parallel to a direction of a rotation axis of the handle.

3. The worm shaft attachment structure for a spinning reel according to claim 1, wherein
said locking member is a plate-shaped member that is bent over so as to restrict the shifting of the first bearing in a direction of a rotation axis of the rotor by closing said aperture portion while also abutting against a rear end surface of the first bearing.

4. The worm shaft attachment structure for a spinning reel according to claim 1, further comprising a second attachment portion to which a front end of the worm shaft is attached, said second attachment portion being formed unitarily with the reel unit, the second bearing, which is disposed at the front end of the worm shaft, being mounted to said second attachment portion.

5. The worm shaft attachment structure for a spinning reel according to claim 4, wherein said second attachment portion includes a through hole portion through which the worm shaft can be passed, the second bearing being mounted in said through hole portion.

6. The worm shaft attachment structure for a spinning reel according to claim 1, wherein said bearing mounting portion is depressed from said aperture portion so as to be U-shaped.

7. The worm shaft attachment structure for a spinning reel according to claim 1, wherein the first bearing has a first protrusion, and said first attachment portion further includes a first depression, which is engageable with the first protrusion of the first bearing.

8. The worm shaft attachment structure for a spinning reel according to claim 5, wherein the second bearing has a second protrusion, and said second attachment portion further includes a second depression, which is engageable with the second protrusion of the second bearing.

9. A spinning reel to be mounted to a fishing rod, comprising:

a handle;

a reel unit that rotatably supports said handle and is to be mounted to the fishing rod;

a rotor supported rotatably at a front of said reel unit;

a spool arranged at a front of said rotor for winding fishing line around its outer circumferential surface, said rotor being for winding fishing line on said spool, said spool being shiftable back and forth;

a rotor driving mechanism for rotating said rotor in cooperation with rotation of said handle;

an oscillation mechanism for reciprocating said spool back and forth in cooperation with rotation of said handle, said oscillation mechanism including a worm shaft rotatably attached to said reel unit via first and second bearings that are disposed at two ends of said worm shaft, said worm shaft having intersecting helical grooves formed on an outer circumferential surface thereof, a slider that moves back and forth along said worm shaft, and an intermediate gear that is fixedly coupled to a front end of said worm shaft; and a worm shaft attachment structure including a mechanism attachment portion formed unitarily with said reel unit, said mechanism attachment portion having formed thereon a first attachment portion, to which a rear end of said worm shaft being mountable, said first attachment portion having an aperture portion and a bearing mounting portion that is depressed from said aperture portion in a first direction, which intersects with a rotation axis direction of said worm shaft, said bearing mounting portion being able to come into contact with an outer circumferential surface of said first bearing to which a rear end of said worm shaft is attachable, the rear end of said worm shaft being mountable to said bearing mounting portion, and a locking member that is mounted detachably to said first attachment portion so as to close said aperture portion and to restrict shifting of said first bearing in the first direction by abutting against the outer circumferential surface of said first bearing.

10. The spinning reel according to claim 9, wherein the first direction is substantially parallel to a direction of a rotation axis of said handle.

11. The spinning reel according to claim 9, wherein said locking member is a plate-shaped member that is bent over so as to restrict the shifting of said first bearing in a direction of a rotation axis of said rotor by closing said aperture portion while also abutting against a rear end surface of said first bearing.

12. The spinning reel according to claim 9, wherein said reel unit further includes a second attachment portion to which a front end of said worm shaft is attached, said second attachment portion being formed unitarily with the reel unit, the second bearing, which is disposed at a front end of the worm shaft, being mounted to said second attachment portion.

13. The spinning reel according to claim 12, wherein said second attachment portion includes a through hole portion through which said worm shaft can be passed, said second bearing being mounted in said through hole portion.

14. The spinning reel according to claim 9, wherein said bearing mounting portion is depressed from said aperture portion so as to be U-shaped.

15. The spinning reel according to claim 9, wherein said first bearing has a first protrusion, and said first attachment portion further includes a depression, which is engageable with said first protrusion of said first bearing.

16. The spinning reel according to claim 12, wherein said second bearing has a second protrusion, and said second attachment portion further includes a second depression, which is engageable with said second protrusion of said second bearing.

17. The spinning reel according to claim 9, wherein said mechanism attachment portion further includes a guide support portion, and said oscillation mechanism further includes a guide shaft arranged above said worm shaft in parallel thereto, said guide shaft piercing said slider and being attached to said guide support portion.

* * * * *